United States Patent
Müller et al.

(10) Patent No.: US 9,213,732 B2
(45) Date of Patent: Dec. 15, 2015

(54) HASH TABLE AND RADIX SORT BASED AGGREGATION

(71) Applicants: Ingo Tobias Müller, Heidelberg (DE); Peter Sanders, Karlsruhe (DE)

(72) Inventors: Ingo Tobias Müller, Heidelberg (DE); Peter Sanders, Karlsruhe (DE)

(73) Assignee: SAP AG, Walldorf (DE)

( * ) Notice: Subject to any disclaimer, the term of this patent is extended or adjusted under 35 U.S.C. 154(b) by 199 days.

(21) Appl. No.: 13/729,111

(22) Filed: Dec. 28, 2012

(65) Prior Publication Data
US 2014/0188906 A1  Jul. 3, 2014

(51) Int. Cl.
*G06F 7/00* (2006.01)
*G06F 17/30* (2006.01)

(52) U.S. Cl.
CPC .... *G06F 17/30339* (2013.01); *G06F 17/30424* (2013.01); *G06F 17/30489* (2013.01)

(58) Field of Classification Search
None
See application file for complete search history.

(56) References Cited

U.S. PATENT DOCUMENTS

| | | | |
|---|---|---|---|
| 8,738,608 B2 * | 5/2014 | Pauly | 707/716 |
| 2006/0116989 A1 | 6/2006 | Bellamkonda et al. | |
| 2012/0011144 A1 | 1/2012 | Transier et al. | |
| 2012/0290615 A1 | 11/2012 | Lamb et al. | |

FOREIGN PATENT DOCUMENTS

EP  2469423 A1  6/2012

OTHER PUBLICATIONS

Albutiu et al., "Massively Parallel Sort-Merge Joins in Main Memory Multi-Core Database Systems", Proceeding of the VLDB Endowment, vol. 5, No. 10, pp. 1064-1075, Aug. 2012, VLDB Endowment.*
Merrill et al., "High Performance and Scalable Radix Sorting: A Case Study of Implementing Dynamic Parallelism for GPU Computing", Parallel Processing Letters, vol. 21, Issue 02, Jun. 2011, World Scientific.*
Blanas et al. Design and Evaluation of Main Memory Hash Join Algorithms for Multi-Core CPUs, SIGMOD '11, pp. 27-48, Jun. 2011, ACM.*
Kim et al., "Sort vs. Hash Revisisted: Fast Join Implementation on Modern Multi-Core CPU", VLDB '09, pp. 1-12, 2009, ACM.*
Pirzadeh et al., "Performance Evaluation of Range Queries in Key Value Stores", J Grid Computing vol. 10, pp. 109-132, Mar. 30, 2012, Springer Science+Business Media B.V.*
Krueger et al., "Applicability of GPU Computing for Efficient Merge in In-Memory Databases", The Second International Workshop on Accelerating Data Management Systems using Modern Processor and Storage Architectures, 2011.*
Merril et al., "High Performance and Scalable Radix Sorting: A Case Study of Implementing Dynamic Parallelism for GPU Computing", Parallel Processing Letters 21, 2011—Pre-Print.*

(Continued)

*Primary Examiner* — Michael Hicks
(74) *Attorney, Agent, or Firm* — Sterne, Kessler, Goldstein & Fox P.L.L.C.

(57) ABSTRACT

Aggregation of an in-memory database includes receiving, by at least one processor having a plurality of threads, input having records stored in random access memory, distributing, by the at least one processor, the input into portions, one of the plurality of threads having an assigned portion, aggregating, by the at least one processor, the records in the assigned portion based on locality of keys in the records and outputting, by the at least one processor, the aggregated records into a global hash table.

13 Claims, 15 Drawing Sheets

(56) References Cited

OTHER PUBLICATIONS

Amur et al., "Memory-Efficient GroupBy-Aggregate using Compressed Buffer Trees", SoCC' 13, 2013, ACM.*

Extended European Search Report for EP Application No. 13198634.1, Munich, Germany, mailed Mar. 13, 2014.

Cieslewicz, et al., "Adaptive Aggregation on Chip Multiprocessors", Sep. 25, 2007, http://www.vldb.org/conf/2007/papers/research/p339-cieslewicz.pdf, retrieved Feb. 25, 2014, 12 pages.

Plattner, "SanssouciDB: An In-Memory Database for Processing Enterprise Workloads", Jan. 31, 2011, http://ares.epi.hpi.uni-potsdam.de/apps/static/papers/btw2011_lattest.pdf, retrieved Feb. 25, 2014, 20 pages.

* cited by examiner

| Algorithm | Problem 1 synchronization | Problem 2 cache utilization locality | Problem 2 no locality | Problem 3 NUMA | Problem 4 multi column | Problem 5 Skew | Problem 6 operator selection |
|---|---|---|---|---|---|---|---|
| 202 — Shared | - - | + + | - | - - | + | - - | - - |
| 204 — Sort-Merge | + + | - | + + | + | + | - - | - |
| 206 — G-Agg. †‡ | o‡ | + + † | + + † | o‡ | - | + + | + + |
| 208 — Hybrid | + + | + + | - | + | - - | + + | - - |
| 210 — Adaptive | + + | + + | + | + + | + | + + | - |
| 212 — PLAT | + + | + + | + | + | + + | + | + |
| 214 — MonetDB ‡ * | + + ‡ | - * | + + | + + | + + | - † | - * |
| 216 — MPSM * | + + | - | + + | + + | + + | + + | - * |
| 218 — HT-2PA | + + | + + | + + | + | + + | + + | - |
| 220 — RX-2PA | + + | - | + | + | + + | - | - |
| 222 — A-2PA | + + | + + | + | + + | + + | + + | + + |
| 224 — A-MPA | + + | + + | + + | + + | + + | + + | + + | o: not applicable, *: join algorithm, †: disk-based,
‡: parallelism not addressed

FIG. 2

| HT-2PA: Private Hash Tables (only keys) |
|---| input : (key[$n$])

tables : (key[$s$])[$n_{threads}$][*]

output : (key[*])

1: for $i \leftarrow 1$ to $n$ parallel do // partition pass
2:    if tables[$id_{thread}$][$n_{tables}$].key.is_full() then
3:       tables[$id_{thread}$][++$n_{tables}$] $\leftarrow$ new hash_table
4:    current $\leftarrow$ tables[$id_{thread}$][$n_{tables}$]
5:    $k \leftarrow$ input.key[$i$]
6:    $h \leftarrow$ extract_bits(0,log($s$),hash($k$))
7:    $pos \leftarrow$ linear_probing(current.key,$h$)
8:    current.key[$pos$] $\leftarrow k$ // k may already be present
9: for $i_{range} \leftarrow 1$ to $n_{ranges}$ parallel do // merge pass
10:    for $i_{thread} \leftarrow 1$ to $n_{threads}$ do
11:       for $i_{table} \leftarrow 1$ to tables[$i_{thread}$].$n_{tables}$ do
12:          current $\leftarrow$ tables[$i_{thread}$][$i_{table}$]
13:          start $\leftarrow$ ($i_{range} \cdot s$)/$n_{ranges}$
14:          end $\leftarrow$ (($i_{range}$ + 1) $\cdot s$)/$n_{ranges}$
15:          for $j \leftarrow$ start to end do
16:             $k \leftarrow$ current.key[$j$]
17:             $h \leftarrow$ hash($k$)
18:             $pos \leftarrow$ linear_probing(current.key,$h$)
19:             output.key[$pos$].aggregate($k$)

| Adaptive Multi-Pass Aggregation (A-MPA) |
|---| input : (key[$n$],value[$n_{value}$][$n$],map[$n$])

adaptive : (key[*],value[$n_{value}$][*],map[*])[$n_{threads}$]

range : (key[*],value[$n_{value}$][*],map[*])[$n_{threads}$]

output : (key[*],value[$n_{value}$][*],map[*])

1: intermediate[0] ← input

2: intermediate[$m$] ← output  // hash table

3: for $i_{pass}$ ← 1 to $m$ − 1 do

4:     intermediate[$i_{pass}$] ← new adaptive

5: for $i_{pass}$ ← 1 to $m$ do

6:     in ← intermediate[$i_{pass}$ − 1]

7:     out ← intermediate[$i_{pass}$]

8:     for each range in in.ranges parallel do

9:         for $i$ = 1 to range.size() do

10:             k ← range.key[$i$]

11:             range.map[$i$] ← out[$id_{thread}$].key.insert(k)

12:     for $j$ ← 1 to $n_{columns}$ do

13:         for each range in in.ranges parallel do

14:             for $i$ ← 1 to range.size() do

15:                 v ← range.value[$j$][$i$]

16:                 index ← range.map[$i$]

17:                 out[$id_{thread}$].value[$j$][index].aggregate(v)

FIG. 5

HASH TABLE AND RADIX SORT BASED AGGREGATION

BACKGROUND

1. Field

The present embodiments are generally related to aggregation of data using a hash table for an online analytical processing (OLAP) database query of an in-memory database system.

2. Background Art

Databases configured for OLAP rely heavily on aggregation, which is ripe for optimization. Meanwhile, the demand for database volume and database speed continues to grow. As databases continue to grow in size they present numerous challenges related to quickly and efficiently performing real-time queries of terabytes (TBs) of data. Aggregation represents a large and important part of such queries.

As databases grow in size, modern hardware continues to grow more powerful and include increasingly more processors with multiple cores. For example, affordable computing devices include two to eight processors each having four to eight cores, each core having two or four hardware contexts. Each core includes one or two levels of primary caches and many processors include features which increase performance such as pipelining, instruction level parallelism, branch prediction and features for synchronization.

Extremely powerful computing devices may be outfitted with several hundred gigabytes (GB) of RAM or even a few TB of RAM. Such advances in hardware have allowed for in-memory database systems. Thus, entire database systems may now be processed and stored in RAM.

Aggregation may be performed in these very large in-memory database systems using modern hardware with a plurality of processors each processor having a plurality of cores executing in parallel. Conventional aggregation techniques struggle with challenges including synchronization, cache utilization, non-uniform access characteristics (NUMA), a plurality of database columns, data skew and operator selection of an optimal aggregation operator by an optimizer.

BRIEF SUMMARY

Multiple threads of a multi-core processor system may perform aggregation when performing OLAP database queries. According to embodiments, aggregation may be performed using bulk-synchronous aggregation algorithms using multiple private hash tables coupled with radix-sort-based aggregation.

More particularly, and without limitation, system, method and computer program product embodiments for aggregation of data in an in-memory database system are provided. In an embodiment, aggregation of an in-memory database includes receiving, by at least one processor having a plurality of threads, input having records stored in random access memory. Next, the at least one processor distributes the input into portions, one of the plurality of threads having an assigned portion. The at least one processor aggregates the records in the assigned portion based on locality of keys in the records. Then, the at least one processor outputs the aggregated records into a global hash table.

Further features and advantages, as well as the structure and operation of various embodiments thereof, are described in detail below with reference to the accompanying drawings. It is noted that the disclosure is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate exemplary embodiments and, together with the description, further serve to explain the principles of the disclosure and to enable a person skilled in the relevant art(s) to make and use the contemplated and disclosed embodiments.

FIG. 2 illustrates a table providing a comparison of conventional aggregation algorithms with example embodiments.

FIGS. 3($a$)-3($c$) illustrate example pseudocode and multiple private hash table (HT-2PA) aggregation according to example embodiments.

FIGS. 4($a$)-4($c$) illustrate example pseudocode and radix-sort-based aggregation (RX-2PA) according to example embodiments.

FIG. 5 illustrates example pseudocode of adaptive multi-pass aggregation (A-MPA) according to example embodiments.

Figure 6:
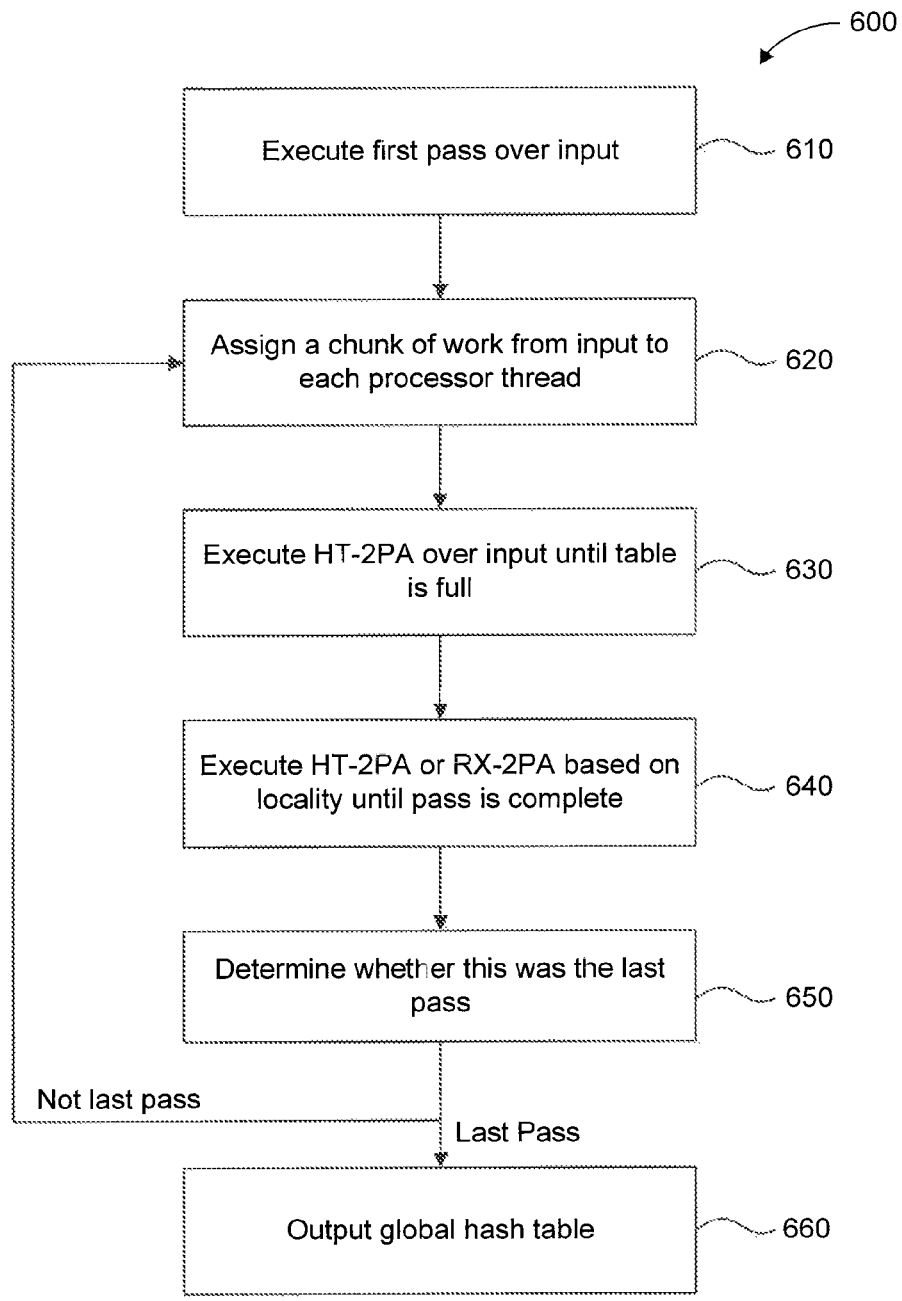

FIG. 6 illustrates a method of A-MPA according to example embodiments.

Figure 7:
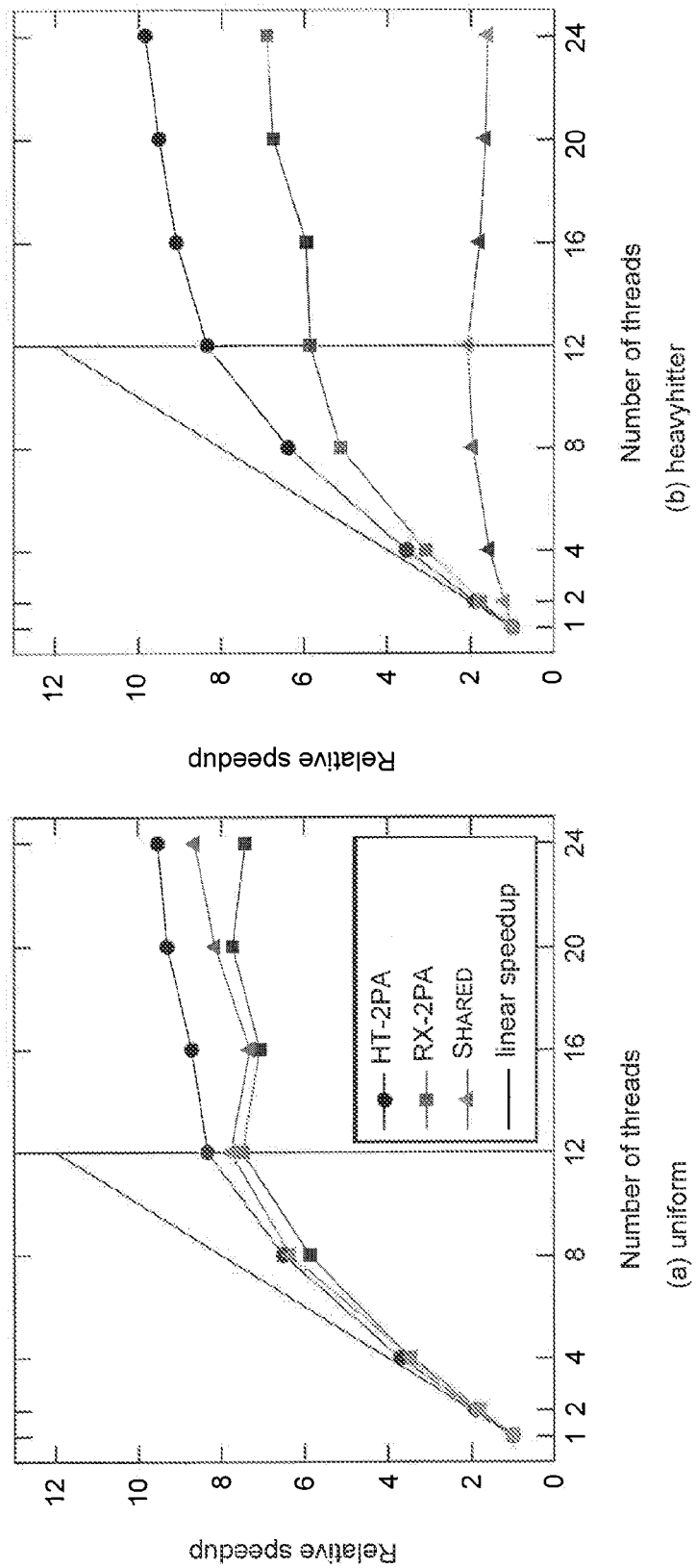

FIGS. 7($a$) and 7($b$) illustrate linear graphs that demonstrate that the example embodiments scale based on a number of threads.

Figure 8:
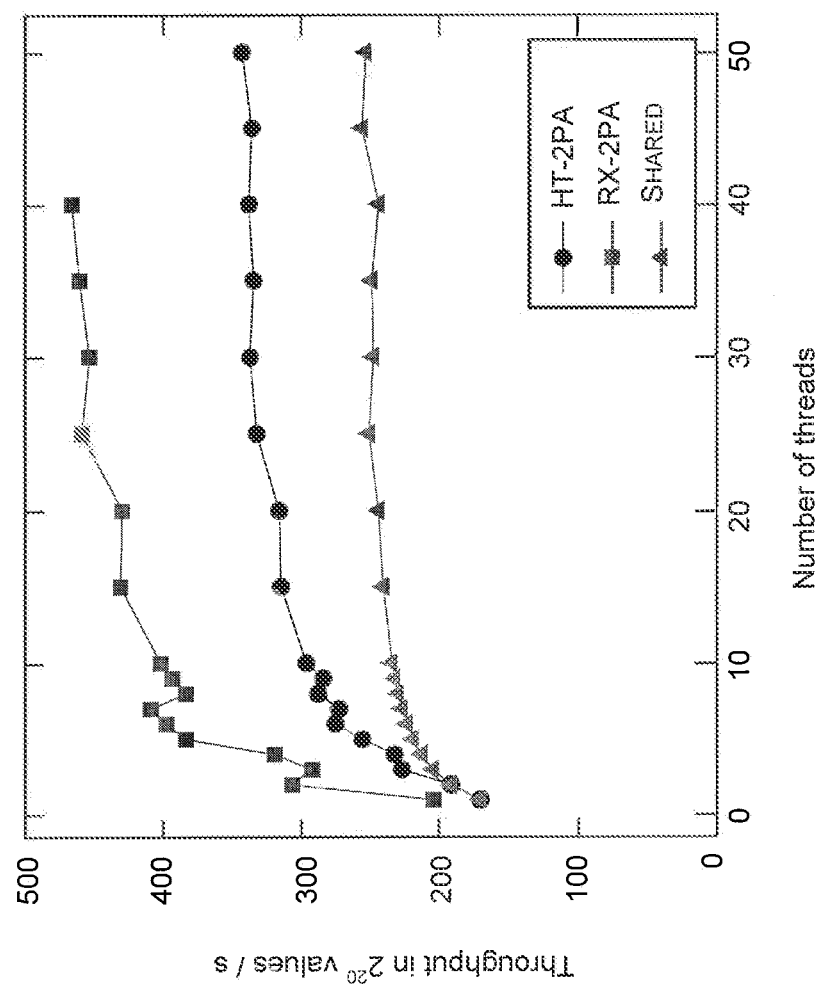

FIG. 8 illustrates a linear graph that demonstrates that the example embodiments have throughput that scales over an aggregate number of columns.

Figure 9:
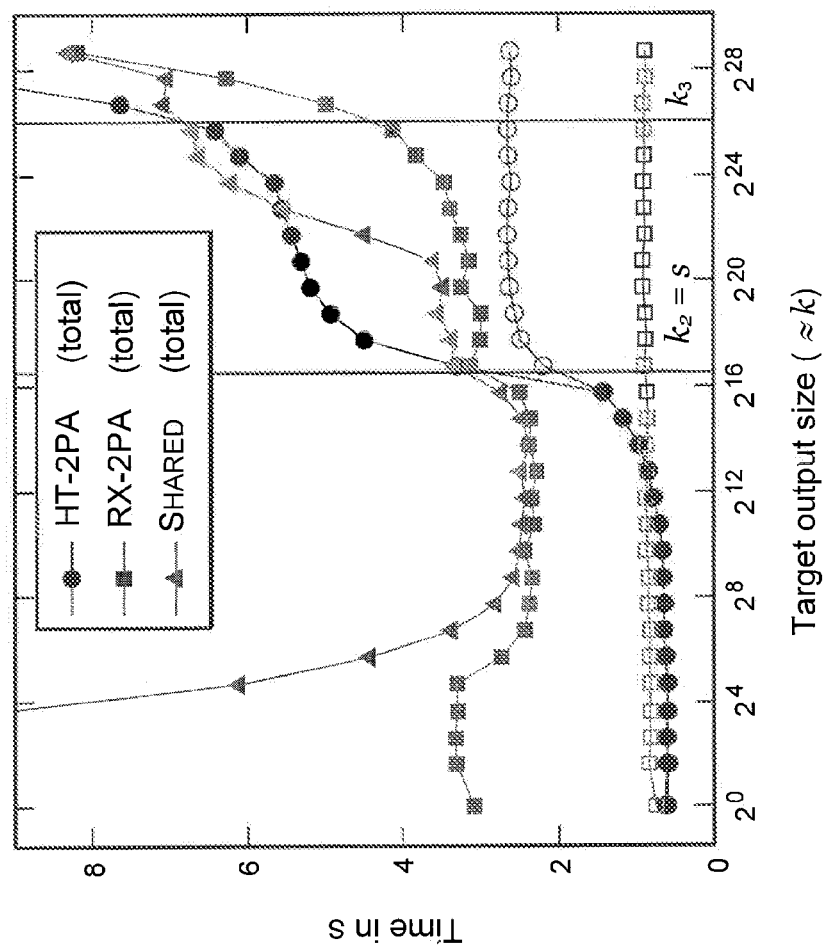

FIG. 9 illustrates linear graphs that provide a time of aggregation for example data input according to example embodiments.

Figure 10:
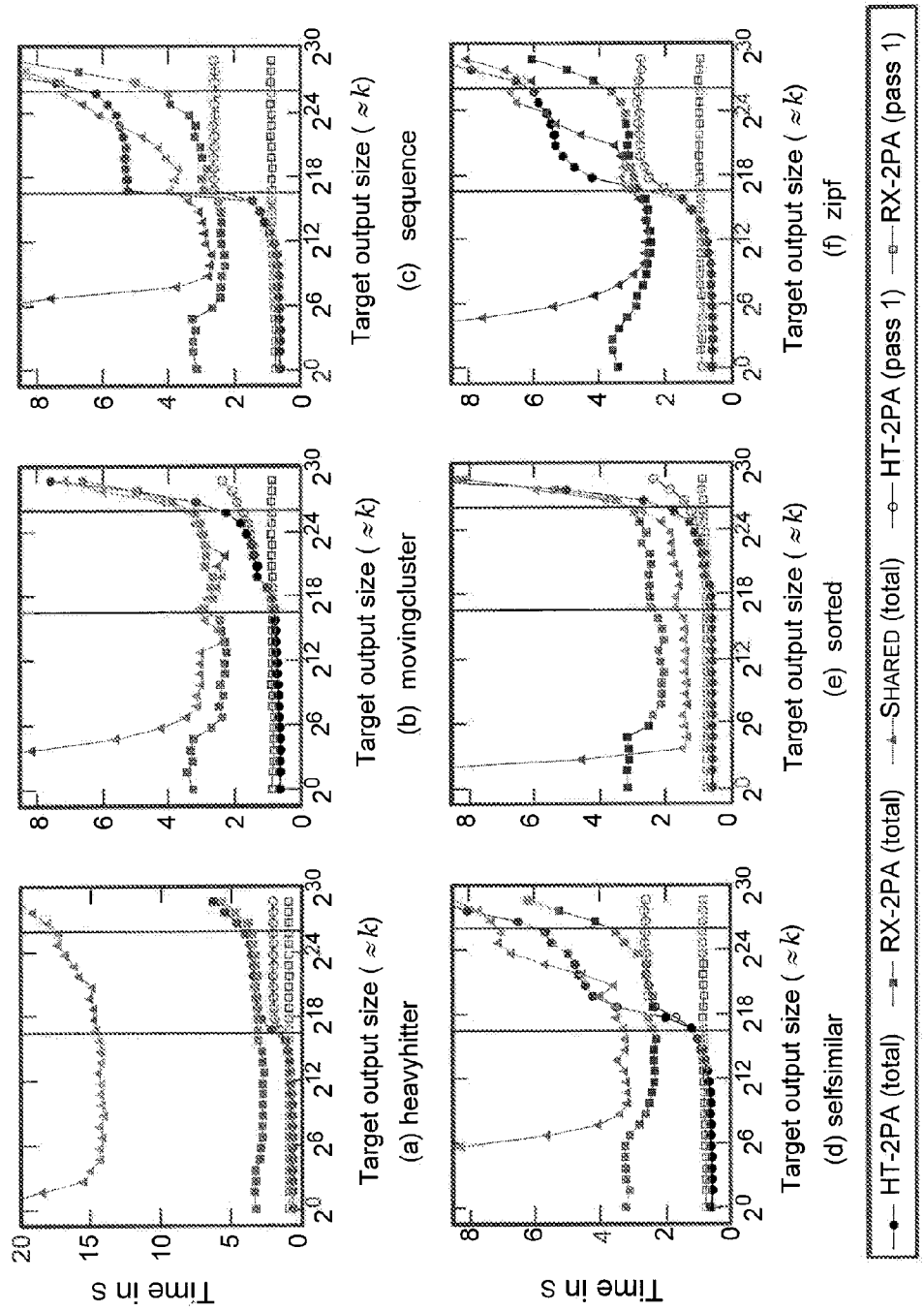

FIGS. 10($a$)-10($f$) illustrate linear graphs that provide a time of aggregation for further example data input according to example embodiments.

Figure 11:
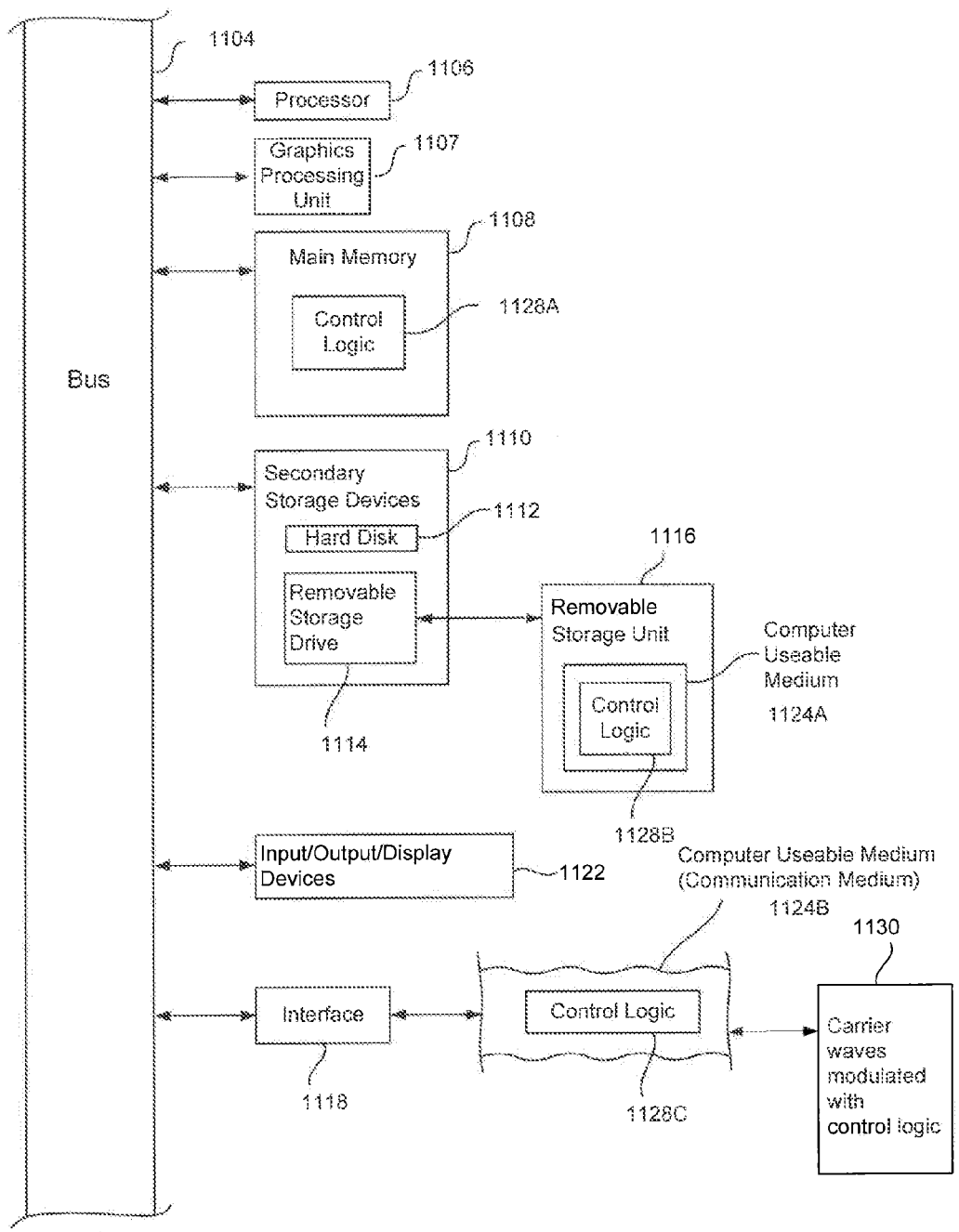

FIG. 11 illustrates an example computer system according to example embodiments.

Features and advantages of embodiments of the present disclosure will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION

Introduction

The following detailed description refers to the accompanying drawings that illustrate exemplary embodiments consistent with this disclosure. Other embodiments are possible, and modifications can be made to the embodiments within the spirit and scope of the embodiments. Therefore, the detailed description is not meant to limit the embodiments. Rather, the scope of the embodiments is defined by the appended claims.

Example Database System

Figure 1:
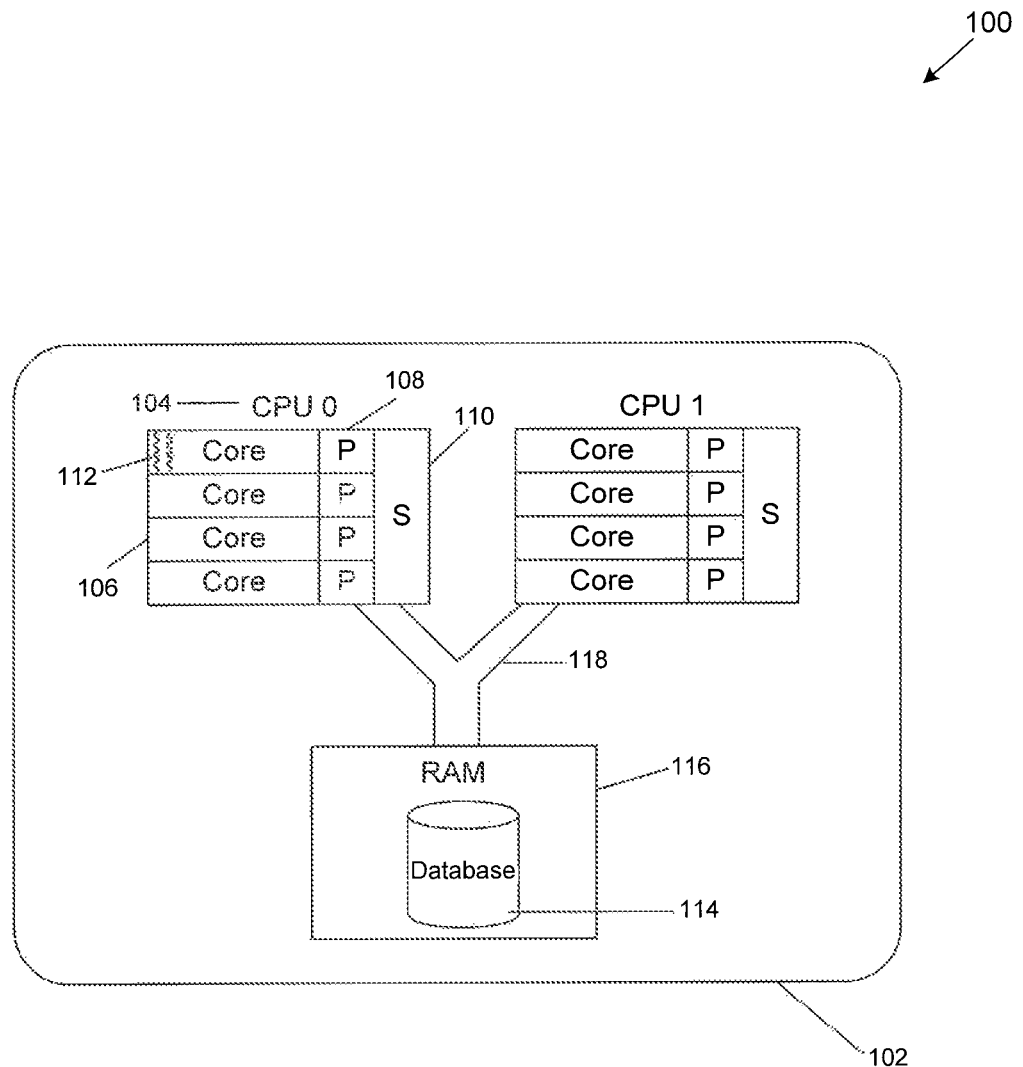
FIG. 1 illustrates a block diagram of a database system according to example embodiments.

FIG. 1 shows a block diagram of a database system 100 according to example embodiments. The database system may be, but is not limited to, an in-memory column-store database system. As shown in FIG. 1, database system 100 may include a computer 102 having at least one processor 104. As an example, the database system 100 in FIG. 1 is shown having two processors, but the database system is not limited to having two processors and may have a single processor or more than two processors. Each processor 104 may include plurality of cores 106 each having a private cache 108. As an example, CPU 0 and CPU 1 in FIG. 1 are shown as having four cores 106 each, but the processors may include less than four cores or more than four cores. Each processor 104 may include another level of cache 110 that is shared among its cores. Each core 106 may have a plurality of hardware contexts, e.g. threads 112. In addition, the computer 102 includes random-access memory (RAM) 110 which may include hundreds of GB or TBs of RAM. According to example embodiments, the database system 114 may be an in-memory column-store database system stored and executed within RAM 116. Thus, as opposed to conventional database systems stored on disk where disk access and speed presents a bottleneck, the RAM 116 of an in-memory database system presents a bottleneck for the faster caches 108 and 110. The RAM 116 having the database system 114 and processors 104 may communicate via a bus 118.

Accordingly, database system architecture may provide intra-operator parallelism, fast synchronization and cache-efficient algorithms maximizing performance by taking advantage of the plurality of cores 106 and their caches 108 and 110.

According to example embodiments, the database system 114 is designed to have a data layout that is column-store, but the database system 114 is not limited to being column-store. The column-store database system 114 targeting OLAP is able to out-perform a row-store database system. OLAP allows execution over only a few columns of the database, and thus only relevant parts of the table need be accessed. According to further embodiments, database operators work column-at-a-time rather than tuples-at-a-time to increase a number of instructions per cycle.

Aggregation of an OLAP database query may occur in an isolated part of an execution plan that is prepared by a query optimizer. The query optimizer predicts an approximate order of magnitude of an output cardinality of an operator. According to example embodiments, aggregation may be performed over the functions AVG, COUNT, MIX, MAX and SUM as well as others that require a state of size of O(1).

As provided above, aggregation operators struggle with a number of problems including synchronization, cache utilization, NUMA, multi-column queries, data skew and selection of an optimal operator by an optimizer. As an example, an input of database records to be aggregated may include a set of n records, each with a k distinct key and a fixed number of values. Output is defined as k records, each having one of the k keys from the input and aggregations of corresponding values of input records associated with a particular key. According to embodiments, an operator may be implemented using a shared hash table whereby a plurality of threads split up the input of the aggregation into chunks and each look up the keys of the input records in the hash table. As further described below, if a key is not present in the hash table, the record is inserted, otherwise values are aggregated based on the key already present in the hash table.

Synchronization introduces major issues for performance even with very powerful hardware. Parallel access of a shared hash table presents major constraints on a plurality of processor cores 106 and does not take advantage of the parallelization provided by the cores 106 and their threads 112. Thus, according to embodiments, bulk-synchronization is to be used. Bulk-synchronization includes synchronization-free computation phases which are separated by synchronization barriers.

RAM access is relatively slow as compared with CPU caches, thus cache efficiency is important regarding the presence and absence of locality in the keys.

Regarding NUMA, memory access and synchronization present a number of issues. Thus, NUMA access is to be limited to a minimum amount with linear access patterns.

Queries over many aggregate columns may increase a cache footprint of an aggregation operator, but this may be avoided by using a column-at-a-time approach.

If keys of input data are skewed and distributed non-uniformly, processor cores may suffer from uneven work balancing.

In addition, a query optimizer usually selects between several implementations of each operator based on statistics. According to example embodiments, an aggregation operator itself may adapt to locality of input.

According to example embodiments, bulk-synchronous, cache efficient algorithms may be applied to aggregation in a column-store database system 114.

Comparison of Aggregation Algorithms

FIG. 2 illustrates a table 200 providing a comparison of aggregation algorithms including conventional algorithms as well as algorithms according to example embodiments and illustrates problems and benefits of each. Traditionally, for disk-based aggregation there are two main aggregation philosophies. In the first philosophy, when there is high locality and when the output fits into a certain amount of memory, a hash table is used according to strategies provided by the SHARED algorithm. If there is low locality and the output is larger, SORT-MERGE aggregation strategy is used.

As shown in FIG. 2, each of the six problems described above is shown. The conventional algorithms suffer from these problems, while bulk-synchronous cache efficient algorithms address and eliminate these problems.

The problems and benefits of the SHARED algorithm are shown in FIG. 2 as 202.

The problems and benefits of the SORT-MERGE algorithm are shown in FIG. 2 as 204.

The problems and benefits of G-AGGREGATION are shown in FIG. 2 as 206. G-AGGREGATION seamlessly transitions from aggregating in-memory to creating partitions on disk when locality decreases by managing input and output blocks. While this is useful for managing disk based databases, modern hardware does not allow as much computation for each data access. Thus, G-AGGREGATION may not be applied directly to in-memory database systems. Furthermore, as shown in FIG. 2, G-AGGREGATION has not been optimized for column-wise processing.

The problems and benefits of the HYBRID algorithm are shown in FIG. 2 as 208. According to HYBRID, each thread aggregates its chunk of input in a private hash table and continuously spills out infrequently used records from its private table to a shared hash table. However, continuous merging makes it difficult to track movement of a record and thus HYBRID is not helpful for a column-at-a-time approach.

The problems and benefits of the ADAPTIVE algorithm are shown in FIG. 2 as 210. ADAPTIVE is a combination of HYBRID with a single shared hash table, which is used in the absence of locality and contention. However, as noted below, aggregation using a shared hash table suffers in the absence of locality.

The problems and benefits of the PLAT algorithm are shown in FIG. 2 as 212 which is a combination of partitioning and hashing.

The problems and benefits of the MonetDB algorithm are shown in FIG. 2 as 214. MonetDB partitions input into multiple passes based on a hash table, but does not address parallelism or skew handling, and does not benefit from high locality.

The problems and benefits of the MPSM algorithm are shown in FIG. 2 as 216. NPSM is a NUMA aware join algorithm that makes use of histograms to split work and minimize NUMA transfer. The MPSM algorithm emphasizes usage of sort-merge rather than hash joins and is only partially applicable to aggregation.

According to example embodiments, the benefits of the algorithms HT-2PA, RX-2PA, A-2PA and A-MPA are shown in FIG. 2 as 218, 220, 222 and 224 respectively. Each of these algorithms is described in detail below. As demonstrated below, the performance of aggregation with a shared hash table is limited by the size of the cache and is dominated by costs for accessing memory. Cache and cache line transfers play a similar role for in-memory algorithms as memory and input/output for disk-based algorithms. The example embodiments presented below provide cache-efficient aggregation.

As will be described in the below embodiments, aggregation may be designed to have a variable number of passes that is proportional to $\log_{M/B} k$, where M is equal to a number of records fitting into internal memory, e.g. cache, and B is equal to a number of records transferred per input/output. Hash aggregation is used when k is small and $\log_{M/B} k <= 1$, e.g. the algorithm performs one pass. For larger k, more passes are needed for cache efficiency, so sort-merge type aggregations are used.

HT-2PA

Figure 3B:
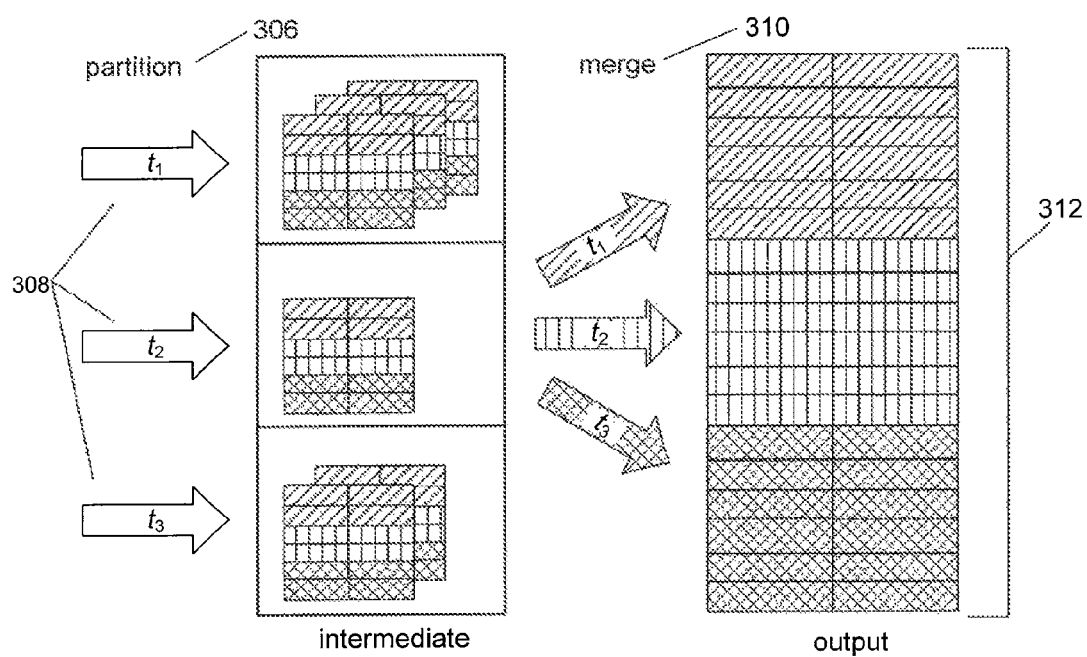
Figure 3C:
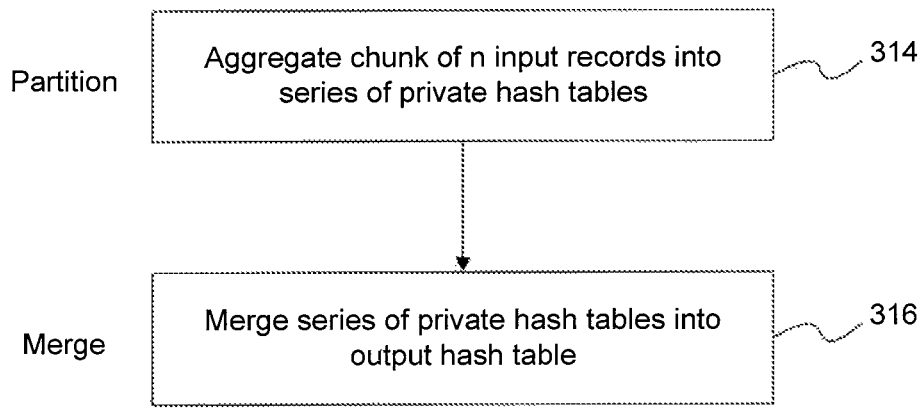

FIGS. 3(a)-3(c) illustrate pseudocode and a graphical representation of multiple-private hash table aggregation (HT-2PA) according to example embodiments. The pseudocode 300 shown in FIG. 3(a) provides an example algorithm which includes two parallelized passes including a partition pass and a merge pass. The partition pass 302 is shown in lines 1-8 of the pseudocode whereby each thread aggregates its chunk of the n input records into a series of private hash tables. The algorithm begins with an intermediate hash table having a fixed size s that is smaller than the cache. When the current intermediate hash table is full, a new intermediate hash table is instantiated and used as provided in line 3 of the pseudocode. In the partition pass, the upper bits of the hashes may be used to determine a location of input records in the hash tables as shown in line 6 of the pseudocode.

The merge pass 304 is shown in lines 9-19 of the pseudocode whereby the aggregated intermediate results of the threads are merged into a global hash table. The same hash function is used and thus the ranges in the global hash table correspond to ranges in the intermediate hash tables. Work may be divided amongst the threads so that the threads work over exclusive ranges of hash values in the intermediate hash tables, e.g. one thread may merge records in the same range of values in all private hash tables into a corresponding range in the output hash table.

According to example embodiments, synchronization is not required in the two passes. In the partition pass 302, the threads write into private data structures. In the merge pass 304, the threads write into distinct locations of the global data structure based on the intermediate results. Thus, according to embodiments, synchronization based issues are resolved.

If there is high locality found in the keys, HT-2PA addresses cache-efficiency issues. If similar keys are found near one another, there is a probability that a key to be inserted is already in a current hash table. Thus, a new record may be aggregated with an existing record. Insertion into the hash table is "cheap" because a table is found entirely within a cache. In addition, the partition pass 302 may condense input having locality greatly, thereby reducing required work for the merge pass 304. It is possible that there may be fewer distinct keys than intermediate hash tables may hold, e.g. k<s, and only a single private hash table will be used per thread. If that occurs, then HT-2PA acts almost as a single pass algorithm. In addition, NUMA problems are addressed because NUMA transfers may be limited to a single, sequential access of condensed intermediate results after the partition pass 302. Skew may be addressed as every key occurs only once per hash table and keys may be distributed equally over each table as a result of hashing.

As shown in FIG. 3(b), the partition pass 302 is shown graphically as 306. This partition pass 306 shows three intermediate sets of hash tables 308, e.g. one intermediate set of hash tables for each thread acting on the input. The merge pass 304 is shown graphically as 310. Each of the sets of intermediate hash tables are merged by the threads into a single output hash table 312.

FIG. 3(c) illustrates a method of HT-2PA based on the pseudocode shown in FIG. 3(a). Step 314 shows the partition pass where each thread of a processing device aggregates its chunk of the n input records into a series of private hash tables. In this step 314, each thread in parallel begins aggregating to a first private hash table until the private hash table is filled. Once the first private hash table is filled, each thread writes to an additional private hash table. This parallel writing into private hash tables in step 314 continues until the thread passes through all assigned input records.

In step 316, each thread of the processing device in parallel merges the private hash tables into a single output hash table. According to example embodiments, step 316 may be executed without synchronization between threads because each thread only works over a specific range of hash values. Thus, in step 316, each thread will only merge and write to a specific distinct range of hash values within the single output hash table.

RX-2PA

Figure 4A:
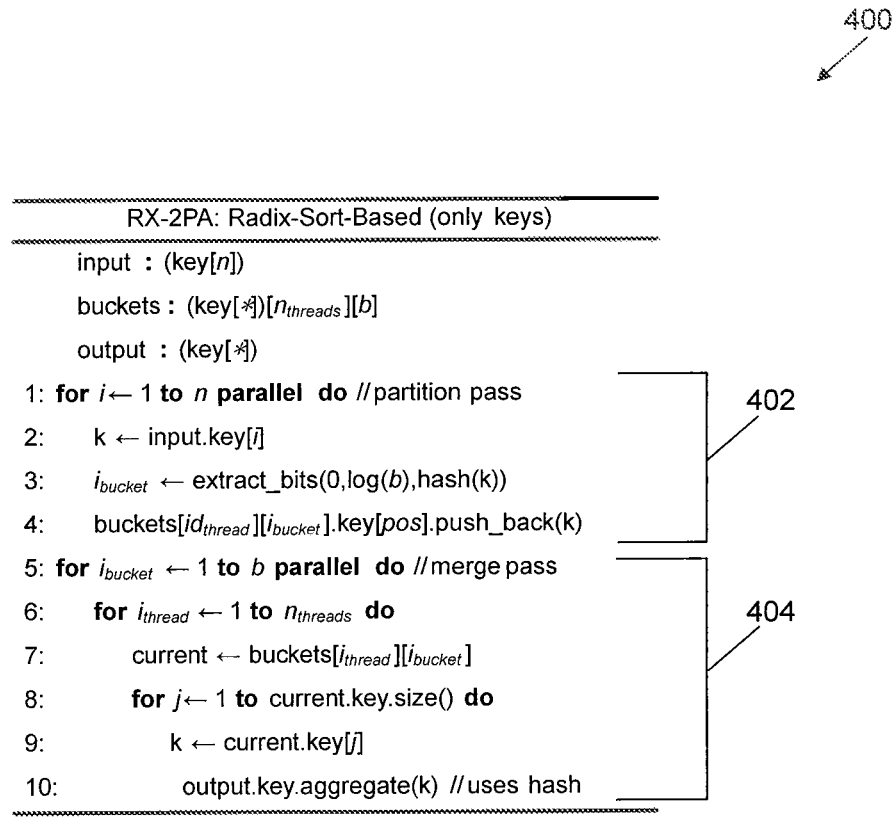
Figure 4B:
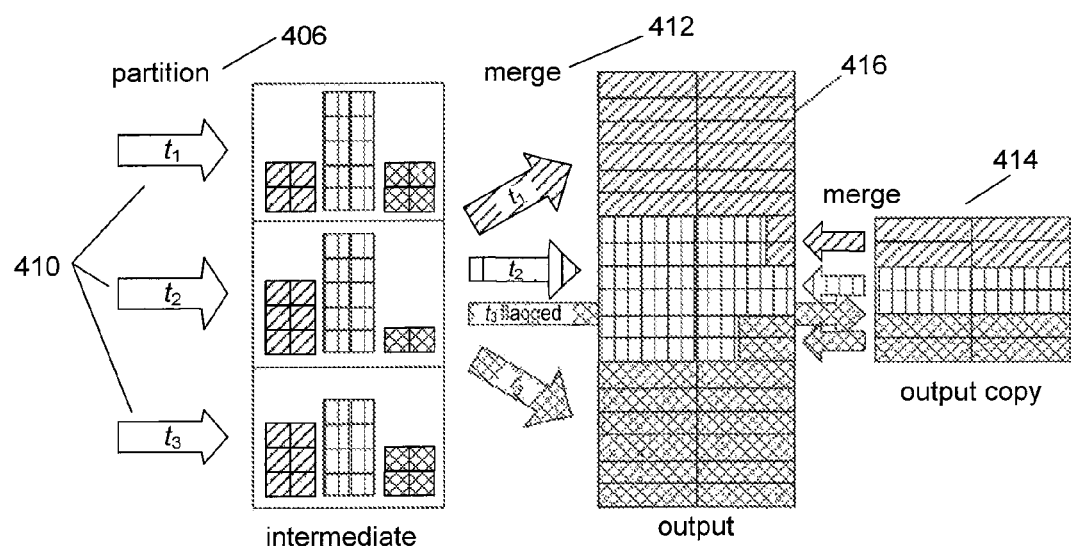
Figure 4C:
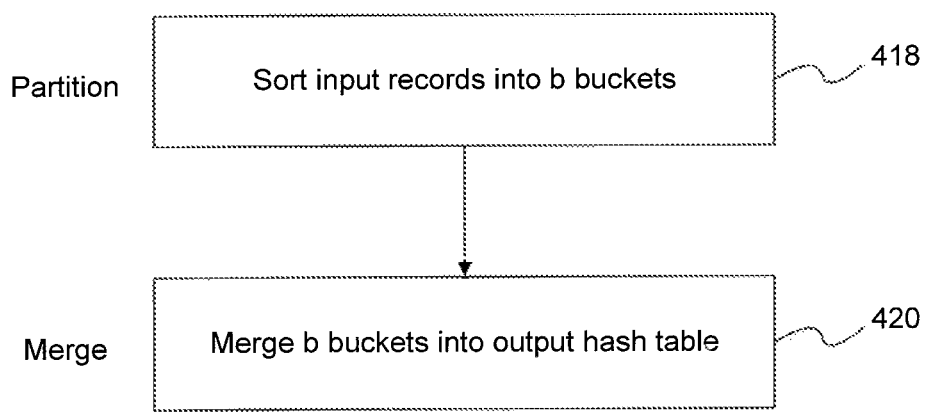

FIGS. 4(a)-4(c) illustrate both pseudocode as well as a graphical representation of radix-sort-based aggregation (RX-2PA) according to example embodiments. Aggregation using private hash tables as described above using HT-2PA executes well when locality is high, but results in a lot of unnecessary work if locality is low because intermediate hash tables may fill before aggregation occurs. If locality is extremely low, e.g. k=n, input may include all distinct keys and thus every record inserted in partition pass 302 may be passed onto merge pass 304. However, using radix-sort-based aggregation allows for "cheaper" partitioning in the case of low locality.

The pseudocode 400 shown in FIG. 4(a) provides an example algorithm which includes radix sort two-pass aggregation. The pseudocode 400 is similar to pseudocode 300 in that there is a partition pass 402 and a merge pass 404. The partition pass 402 is shown in lines 1-4 whereby each thread partitions a chunk of input into b buckets using an upper log(b) of bits of a bash of the keys as shown in line 4 of the pseudocode, similar to a radix-sort. According to embodiments, partitioning is accomplished using a cache-aware, bandwidth optimized approach of radix sort. As opposed to the partition pass 302 of HT-2PA, the partition pass 402 of RX-2PA does not aggregate.

In the merge pass 404, resulting buckets are merged in parallel into a global output hash table using all bits of the hash as provided in lines 5-10 of the pseudocode 400. Similar to the merge pass 304 of HT-2PA, each thread merges an equivalent set of buckets from all threads in the merge pass 404 so that each output location is written exclusively by a single thread. According to example embodiments, merge pass 404 may require a longer time than merge pass 304 because the input to the merge pass 404 is not yet aggregated as in merge pass 304.

RX-2PA provides a synchronization-free solution and provides a bulk-synchronization design. In addition, cache may be used efficiently in the absence of locality and there is only a single, sequential NUMA remote access.

Radix-sort-based synchronization does not adequately address skew. Hashing only partially solves skew issues by distributing keys evenly over the buckets. If some keys are found more frequently than other keys, some buckets may be larger than others and contain more records. As a result, work may be distributed unevenly among threads executing the merge pass 404. In addition, this problem may also result if there are fewer keys than threads.

To address these issues, according to example embodiments, buckets that include more records than other buckets may be split to evenly distribute work amongst threads operating on the buckets. As an example, for n input records and p threads, no work item should include more than n/p records in order to allow a balanced distribution of work. As a result, larger buckets should be split up into work items including no more than n/p records. Work items are then sorted by their size and distributed in a round-robin fashion in order to approximate an equal work distribution.

As a result of this double merge optimization, two or more work items may include a same range of hash values and could potentially write to a same output location. In order to prevent synchronization, only one work item per range is merged into the output hash table. Other work items are flagged and merged into private copies of corresponding portions of the hash table as shown in FIG. 4(b) at 414. These copies are then collaboratively merged in a second merge pass having more finely grained value ranges.

This second merge pass possibly introduces additional costs, but they are almost always non-existent or negligible. However, according to example embodiments, this second merge pass may be eliminated.

As shown in FIG. 4(b), the partition pass 402 is shown graphically as 406. This partition pass 402 shows three threads placing data into buckets 410. The first merge pass is shown graphically as 412. The second merge pass is shown graphically as 414. A single output hash table 416 is shown as a result of the first merge pass 412 and the second merge pass 414.

FIG. 4(c) illustrates a method of RX-2PA based on the pseudocode shown in FIG. 4(a). Step 418 shows the partition pass where each thread of a processing device sorts a chunk of input records into b buckets using an upper log(b) of bits of a hash of the keys. According to example embodiments, step 418 does not aggregate the input records. This parallel sorting into buckets in step 418 continues until the thread passes through all assigned input records. In step 420, each thread of the processing device in parallel merges its buckets into a single output hash table. According to example embodiments, step 420 may be executed without synchronization between threads because each thread only works over a specific range of hash values. Thus, in step 420 each thread will only merge and write to a specific distinct range of hash values within the single output hash table.

A-2PA

FIG. 5 illustrates pseudocode 500 for adaptive aggregation according to example embodiments. As provided above, private hash table aggregation (HT-2PA) is best used when locality is present because HT-2PA can make use of cache in order to allow random access to aggregate "cheaply" thereby reducing an amount of work for merge pass to a minimum. However, radix-sort-based aggregation (RX-2PA) is best used in the absence of locality as RX-2PA does not waste time attempting to aggregate in the cache. However, both HT-2PA and RX-2PA have a similar design because they both include a merge pass and provide an output having a same data structure. Thus, according to example embodiments, it is possible to use aspects of both HT-2PA and RX-2PA in combination during execution.

According to example embodiments, A-2PA selects a best of HT-2PA and RX-2PA. By adapting to changing locality during execution, skew and operation selection issues may be avoided.

A-2PA utilizes an intermediate data structure that includes both hash tables and radix buckets. Each thread has its own private intermediate hash table and includes room for s' records to be inserted. If the private intermediate hash table is filled but there are records left, the thread checks an aggregation factor or ratio a which is equal to s'/s, s' being the number of records that are stored in the private intermediate hash table and s being a size of a private intermediate hash table. This aggregation factor or ratio is low if input is approximately equal to output, e.g. keys are distinct, and is high if input is being aggregated within intermediate cache tables, e.g. there are fewer distinct keys. If this aggregation factor is greater than a threshold, the private hash table is amortized and the thread begins using an additional private hash table. However, if the aggregation factor is less than the threshold, the thread executes radix bucket partitioning to increase locality in the records. This threshold is dependent upon a cost of inserting a tuple into a bucket in an intermediate hash table and in the global hash table and may be determined at database installation time. After a particular number of input records, the thread transitions back to using an additional empty private hash table.

The thread is able to adapt to input by selecting the better of the two algorithms based on locality during partitioning and continues to partition all records into either hash tables or buckets in a single pass. After partitioning all records, adaptive aggregation proceeds to a merge pass as provided above in order to merge intermediate data structures into an output hash table. According to example embodiments, each thread checks repeatedly and independently of all other threads and thus adaptive aggregation is able to adapt to varying distributions of records.

A-MPA

Adaptive multi-pass aggregation addresses all problems shown in FIG. 2 and is well suited for input having many columns. According to embodiments, FIG. 5 illustrates pseudocode 500 of adaptive multi-pass aggregation which includes a single loop having a variable number of passes m as shown in lines 5-17. Input of the first pass, 0, is provided in line 1 and the output of the last pass, m, is a global hash table as shown in line 2. Input of each pass is output of a previous pass as provided in lines 6 and 7.

As in the adaptive aggregation A-2PA described above, the intermediate data structure includes both an adaptive mix of hash tables and buckets as indicated in line 4 of the pseudocode. This mix of hash tables and buckets adapts in the presence or absence of locality in input keys. The intermediate data structure is divided into and provides access to ranges which are translated into a sequence of buckets or position ranges of the buckets as well as hash tables of all threads as shown in lines 9 and 14 of the pseudocode. The ranges may be distributed over the threads which merge the intermediate data structure ranges into the intermediate data structure of a next pass as shown in line 11 of the pseudocode. Accordingly, the records are either pushed at the end of a bucket or inserted into a hash table. Line 11 of the pseudocode also provides column-wise processing. A key column is provided "special treatment," e.g. while this column is processed, input rows are mapped to output indices. This mapping is then iteratively applied to value columns as provided in lines 12-17 of the pseudocode. All values of a record will follow the exact same movement as their key, one after another.

A number of passes of A-MPA is determined based on log(b) bits of the hash of the key. In the last pass, up to log(m) bits may not be determined thereby keeping A-MPA cache efficient. As a result, roughly log(k) bits are to be determined in order to correctly insert each key.

A-MPA does not need an additional merge pass as provided in RX-2PA and A-2PA as long as there are more than two passes and reasonable number of processor cores because there is not a global data structure. The product of additional work items may be used as regular input for a third pass and the buckets need not be split up because strong skew is eliminated by previous passes.

Thus, each input record is to be moved a logarithmic number of times depending upon k. According to embodiments, A-MPA executes a cache-efficient number of passes equal to log(k) and provides a proper balance between high locality and low locality to maximize efficiency when executed on machines having a plurality of processors with a number of cores. Thus, records may be aggregated as early as possible to save work later, but aggregation may be avoided when cost is higher than its benefit.

According to embodiments, FIG. 6 illustrates a method of adaptive multi-pass aggregation (A-MPA) 600 which provides as output a global hash table based on the pseudocode provided in FIG. 5. According to example embodiments, each of a plurality of processor threads works in parallel to perform adaptive-multi pass aggregation when a query is received.

In step 610, a first pass is executed over input including data records each having one of k distinct keys.

In step 620, each processor thread is assigned work comprising a portion or chunk of the input records.

In step 630, each processor thread begins work in parallel by executing the partitioning of HT-2PA and determining whether the key for the input record is already found within its current private intermediate hash table. If the key is not found in the private intermediate hash table, then the record is inserted into the private intermediate hash table. However, if the key is found, the record is aggregated with corresponding records in the private intermediate hash table.

In step 640, if a current private intermediate hash table is found to be full, the thread determines an aggregation factor which is equal to a number of records inserted into the private intermediate hash table divided by the size of the private intermediate hash table. If this aggregation factor is greater than a particular threshold, then there is sufficient locality and the thread creates an additional private intermediate hash table. However, if the aggregation factor is less than or equal to a particular threshold, there is not sufficient locality and the thread executes radix bucket partitioning based on RX-2PA in the current pass on a next part of the portion of input records. Using RX-2PA, the next part of the portion of input records is partitioned into buckets using an upper log(b) bits of the hash of the keys similar to radix-sort as described above. After a particular number of input records, the thread moves back to executing HT-2PA and creates an additional private intermediate hash table. This combination of partitioning using HT-2PA and RX-2PA continues until a current pass is complete. Thus, according to example embodiments, the intermediate data structure includes both private intermediate hash tables and radix buckets, both providing access to ranges of hash values.

In step 650, it is determined whether this was the last pass. If it is determined that this was not the last pass, the method returns to step 620 and uses the intermediate data structure as input for a next pass. However, if this was the last pass, then the intermediate data structure is output as a global hash table in step 660.

Analysis of Example Embodiments

As an example, input data may have data structures such as simple arrays, one array having a key and one array for each aggregate column. A size of the intermediate hash tables s may be fixed to half the size of the cache per thread. The hash function is optimized for small keys to keep overhead for hashing low. A suitable hash function such as the 32 bit variant of Murmur2 utilizes a few CPU cycles to hash each key when inserting the key into the hash table. According to example embodiments, $2^{17}$ records may fit into the cache (intermediate hash tables) having a block size of 16 (number of records per cache line). Thus, the number of passes may be $\log_{M/B}(k) > 2$, e.g. greater than 2 if $k > 2^{26}$. The final pass may sort $\log(s) = \log(2^{17})$ or 17 bits and the other passes will sort $\log(256)$ or 8 bits. Thus, two passes are enough for roughly $k <= 2^{25}$.

The example embodiments were analyzed using synthetic data as well as real-life data and are applicable to all different types of input data. As an example, input data may have keys distributed in a myriad of ways including examples such as (a) heavyhitter, (b) movingcluster, (c) selfsimilar, (d) sequence, (e) sorted, (f) uniform and (g) zipf. In heavyhitter, 50% of all records have a same key, and the other example data input includes keys that are distributed uniformly from 2 to k. In movingcluster, the keys are chosen uniformly from a sliding window size of 1024. sequence includes a repeated sequence of numbers 1 to k, selfsimilar includes a Pareto distribution with an 80-20 proportion and zipf includes a Zipfian distribution with exponent 0.5. Example embodiments were analyzed using these example data distributions as shown in FIGS. 7-10. Each of these FIGS. 7-10 provides an analysis of algorithms as described according to example embodiments with the simple shared hash map SHARED conventional algorithm.

As shown in FIGS. 7(a) and 7(b), the example embodiments provide aggregation performance speed that scales based on a number of processor cores and threads. The speed improvement that results is nearly linear until there are 8 threads and continues to greatly improve until there are 12 threads. However, as the number of threads increases beyond 12, there is not as much improvement because the embodiments are memory-bound. In general, 4 threads may be sufficient to saturate the memory bus of a single CPU. FIG. 7(b) also shows the contention problems of the SHARED algorithm as the heavyhitter distribution increases only slightly in performance as the number of cores increase, but then even begins to decrease around 16-24 cores.

As shown in FIG. 8, the example embodiments provide throughput on uniform distribution performance that scales based on a number of aggregate columns. Throughput per second is shown in FIG. 8. For aggregate columns, nothing is done except for moving data. Thus, throughput benefits from a good memory access pattern. RX-2PA provides a best access pattern and HT-2PA also provides a good pattern. The conventional SHARED algorithm is limited by memory access.

According to example embodiments, FIG. 9 provides a linear graph illustrating an analysis of the influence of a number of distinct keys k having uniform distribution. FIG. 9 provides an analysis of the performance time of aggregation in seconds when the input keys have a uniform distribution. k is the most important factor in determining performance because k determines which embodiments are to be used. HT-2PA is the fastest for a small k value because the threads only need to partition in respective private caches and there is little to merge in the merge pass because There is only one table per thread. Thus, HT-2PA greatly addresses cache issues for high locality.

However, as k increases, cost increases somewhat. As k grows larger than a size of intermediate hash table s, passes become more expensive. Lower locality means that the threads will have to fill more than one hash table during partition pass thereby causing more work during the merge pass. RX-2PA scales more robustly with respect to k. Costs of partition pass are independent of k and the costs of merge pass are quite stable except for some additional overhead for additional work items when k<p.

According to example embodiments, as shown in FIGS. 10(a)-10(f), skew within input data can cause contention and may cause unbalanced distribution of work amongst threads. Contention presents a problem for a shared hash table due to fine grained synchronization. CPU contention, or wait time, results from bottlenecks such as fine grained synchronization between processor cores and threads. However, as a result of the bulk-synchronization, the example embodiments do not suffer from contention. Hash table based algorithms are not prone to skew because they immediately aggregate input, but RX-2PA is somewhat vulnerable. However, the second merge pass of RX-2PA addresses any skew related issues. Skew is also related to locality and thus RX-2PA shows improvement once k grows. A-MPA addresses both high and low locality and also does not suffer from contention.

According to example embodiments, FIGS. 10(a)-10(f) provide an analysis of the performance time of aggregation in seconds when the input keys have a heavyhitter distribution, a movingcluster distribution, a sequence distribution, a self-similar distribution, a sorted distribution and a zipf distribution.

In conclusion, the example embodiments aggregate and address a number of problems and issues presented by conventional aggregation schemes. The example embodiments address synchronization by replacing fine grained synchronization with a bulk-synchronization approach. Furthermore, cache efficiency is maintained by implementing multiple partition passes based on a degree of locality. NUMA related issues are addressed by limiting a NUMA-remote memory access to a single sequential read of data. The example embodiments process column-stores a column-at-a-time and address skew by hashing and partitioning and also address selection by integrating all adaptive logic into the operator.

Thus, the example embodiments utilize an adaptive approach that applies hashing to allow work distribution and early aggregation while simultaneously utilizing sorting to achieve cache efficiency. In other words, the example embodiments partially sort and aggregate intermediate results from a query in parallel using a plurality of threads, e.g. hash and sort simultaneously. As main transitory memory continues to grow in size and a number of processors and cores continue to increase, the example embodiments will continue to provide advantages not provided by conventional aggregation schemes.

Example Computer Implementation

In an example embodiment, the systems, methods and computer products described herein are implemented using well known computers, such as computer 1100 shown in FIG. 11.

Computer 1100 can be any commercially available and well known computer capable of performing the functions described herein, such as computers available from International Business Machines, Apple, Sun, HP, Dell, Compaq, Digital, Cray, etc.

Computer 1100 includes one or more processors (also called central processing units, or CPUs), such as a processor 1106. The processor 1106 is connected to a communication bus 1104. Processors 1106 may include any conventional or special purpose processor, including, but not limited to, digital signal processor (DSP), field programmable gate array (FPGA), and application specific integrated circuit (ASIC).

Computer 1100 includes one or more graphics processing units (also called GPUs), such as GPU 1107. GPU 1107 is a specialized processor that executes instructions and programs selected for complex graphics and mathematical operations in parallel.

Computer 1000 also includes a main or primary memory 1108, such as random access memory (RAM). The primary memory 1108 has stored therein control logic 1128A (computer software), and data.

Computer 1100 also includes one or more secondary storage devices 1110. The secondary storage devices 1110 include, for example, a hard disk drive 1112 and/or a removable storage device or drive 1114, as well as other types of storage devices, such as memory cards and memory sticks. The removable storage drive 1114 represents a floppy disk drive, a magnetic tape drive, a compact disk drive, an optical storage device, tape backup, etc.

The removable storage drive 1114 interacts with a removable storage unit 1116. The removable storage unit 1116 includes a computer useable or readable storage medium 1124A having stored therein computer software 1128B (control logic) and/or data. Removable storage unit 1116 represents a floppy disk, magnetic tape, compact disk, DVD, optical storage disk, or any other computer data storage device. The removable storage drive 1114 reads from and/or writes to the removable storage unit 1116 in a well-known manner.

Computer 1100 also includes input/output/display devices 1122, such as monitors, keyboards, pointing devices, touchscreen displays, etc.

Computer 1100 further includes a communication or network interface 1118. The network interface 1118 enables the computer 1100 to communicate with remote devices. For example, the network interface 1118 allows computer 1100 to communicate over communication networks or mediums 1124B (representing a form of a computer useable or readable medium), such as LANs, WANs, the Internet, etc. The network interface 1018 may interface with remote sites or networks via wired or wireless connections.

Control logic 1128C may be transmitted to and from computer 1100 via the communication medium 1124B. More particularly, the computer 1100 may receive and transmit carrier waves (electromagnetic signals) modulated with control logic 1130 via the communication medium 1124B.

Any apparatus or manufacture comprising a computer useable or readable medium having control logic (software) stored therein is referred to herein as a computer program product or program storage device. This includes, but is not limited to, the computer 1100, the main memory 1108, the secondary storage devices 1110, the removable storage unit 1116 and the carrier waves modulated with control logic 1130. Such computer program products, having control logic stored therein that, when executed by one or more data processing devices, cause such data processing devices to operate as described herein, represent embodiments of the disclosure.

The disclosure can work with software, hardware, and/or operating system implementations other than those described herein. Any software, hardware, and operating system implementations suitable for performing the functions described herein can be used.

Conclusion

It is to be appreciated that the Detailed Description section, and not the Summary and Abstract sections, is intended to be used to interpret the claims. The Summary and Abstract sections may set forth one or more, but not all, exemplary embodiments as contemplated by the inventors, and thus, are not intended to limit the disclosure and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the specification is to be interpreted by the skilled artisan in light of the teachings and guidance.

The breadth and scope of the disclosure should not be limited by any of the above-described exemplary embodiments, but should be defined only in accordance with the following claims and their equivalents.

What is claimed is:

1. A method, comprising:
receiving, by at least one processor having a plurality of threads, a query comprising an aggregation operation that aggregates a plurality of records across a plurality of columns stored in random access memory;
distributing, by the at least one processor, a portion of the records to each of the plurality of threads for aggregation;
determining an aggregation threshold based on a ratio of a number of records stored in an intermediate private hash table to a size of the intermediate private hash table;
aggregating in accordance with the aggregation operation, by a first thread of the plurality of threads, the portion of records distributed to the first thread into a result stored in one or more hash tables associated with the first thread,
wherein if a locality of keys is greater than the aggregation threshold, the aggregating uses multiple private hash tables, and
wherein if the locality of keys is less than or equal to the aggregation threshold, the aggregating uses a radix-sort based aggregation; and
outputting, by the first thread, the result into a global hash table asynchronously with respect to any other threads of the plurality of threads.

2. The method of claim 1, wherein the aggregating comprises:
aggregating the records in the assigned portion using both multiple private hash tables and radix-sort buckets.

3. The method of claim 1, further comprising:
performing the aggregating in a number of passes proportional to log(k) where k is equal to a number of distinct keys found in the records.

4. The method of claim 3, further comprising:
determining log(k) bits of a hash of each of the distinct keys found in the records.

5. The method of claim 1, wherein the aggregation operation comprises determining an average of at least a subset of the records.

6. The method of claim 1, wherein the aggregating comprises:
aggregating, by each thread, its portion of records one column at a time.

7. The method of claim 1, wherein each thread outputs its result to a distinct location in the global hash table.

8. A system, comprising:
random access memory configured to store a database; and
at least one processor having a plurality of threads configured to:
receive, by at least one processor having a plurality of threads, a query comprising an aggregation operation that aggregates a plurality of records across a plurality of columns stored in random access memory;
distribute, by the at least one processor, a portion of the records to each of the plurality of threads for aggregation;
determine an aggregation threshold based on a ratio of a number of records stored in an intermediate private hash table to a size of the intermediate private hash table;
aggregate in accordance with the aggregation operation, by a first thread of the plurality of threads, the portion of records distributed to the first thread into a result stored in one or more hash tables associated with the first thread,
wherein if a locality of keys is greater than the aggregation threshold, the aggregating uses multiple private hash tables, and
wherein if the locality of keys is less than or equal to the aggregation threshold, the aggregating uses a radix-sort based aggregation; and
output, by the first thread, the result into a global hash table asynchronously with respect to any other threads of the plurality of threads.

9. The system of claim 8, wherein the at least one processor is configured to:
aggregate the records in the assigned portion using both multiple private hash tables and radix-sort buckets.

10. The system of claim 8, wherein the at least one processor is configured to:
aggregate in a number of passes proportional to log(k) where k is equal to a number of distinct keys found in the records.

11. The system of claim 8, wherein the at least one processor is further configured to:
determine log(k) bits of a hash of each of the distinct keys found in the records.

12. A computer-readable device having instructions stored thereon, execution of which, by at least one computing device, causes the at least one computing device to perform operations comprising:
- receiving, by at least one processor having a plurality of threads, a query comprising an aggregation operation that aggregates a plurality of records across a plurality of columns stored in random access memory;
- distributing, by the at least one processor, a portion of the records to each of the plurality of threads for aggregation;
- determining an aggregation threshold based on a ratio of a number of records stored in an intermediate private hash table to a size of the intermediate private hash table;
- aggregating in accordance with the aggregation operation, by a first thread of the plurality of threads, the portion of records distributed to the first thread into a result stored in one or more hash tables associated with the first thread,
- wherein if a locality of keys is greater than the aggregation threshold, the aggregating uses multiple private hash tables, and
- wherein if the locality of keys is less than or equal to the aggregation threshold, the aggregating uses a radix-sort based aggregation; and
- outputting, by the first thread, the result into a global hash table asynchronously with respect to any other threads of the plurality of threads.

13. A method, comprising:
- receiving, by at least one processor having a plurality of threads, a query comprising an aggregation operation that aggregates a plurality of records across a plurality of columns stored in random access memory;
- distributing, by the at least one processor, a portion of the records to each of the plurality of threads for aggregation;
- aggregating in accordance with the aggregation operation, by a first thread of the plurality of threads, the portion of records distributed to the first thread into a result stored in one or more hash tables associated with the first;
- determining, by the at least one processor, an aggregation threshold equal to $s' / s$, where $s'$ is equal to a number of records stored in an intermediate private hash table and $s$ is equal to a size of the intermediate private hash table;
- performing, by the at least one processor, the aggregating in a number of passes proportional to $\log(k)$ where $k$ is equal to a number of distinct keys found in the records, by aggregating the records in the assigned portion using intermediate private hash tables if the locality of keys is greater than the aggregation threshold or using radix-sort based aggregation if the locality of keys is less than or equal to the aggregation threshold; and
- outputting, by the first thread, the result into a global hash table asynchronously with respect to any other threads of the plurality of threads.

* * * * *